2 Sheets—Sheet 1.
R. MORGAN.
STONE SAWING MACHINE.
No. 93,898.         Patented Aug. 17, 1869.
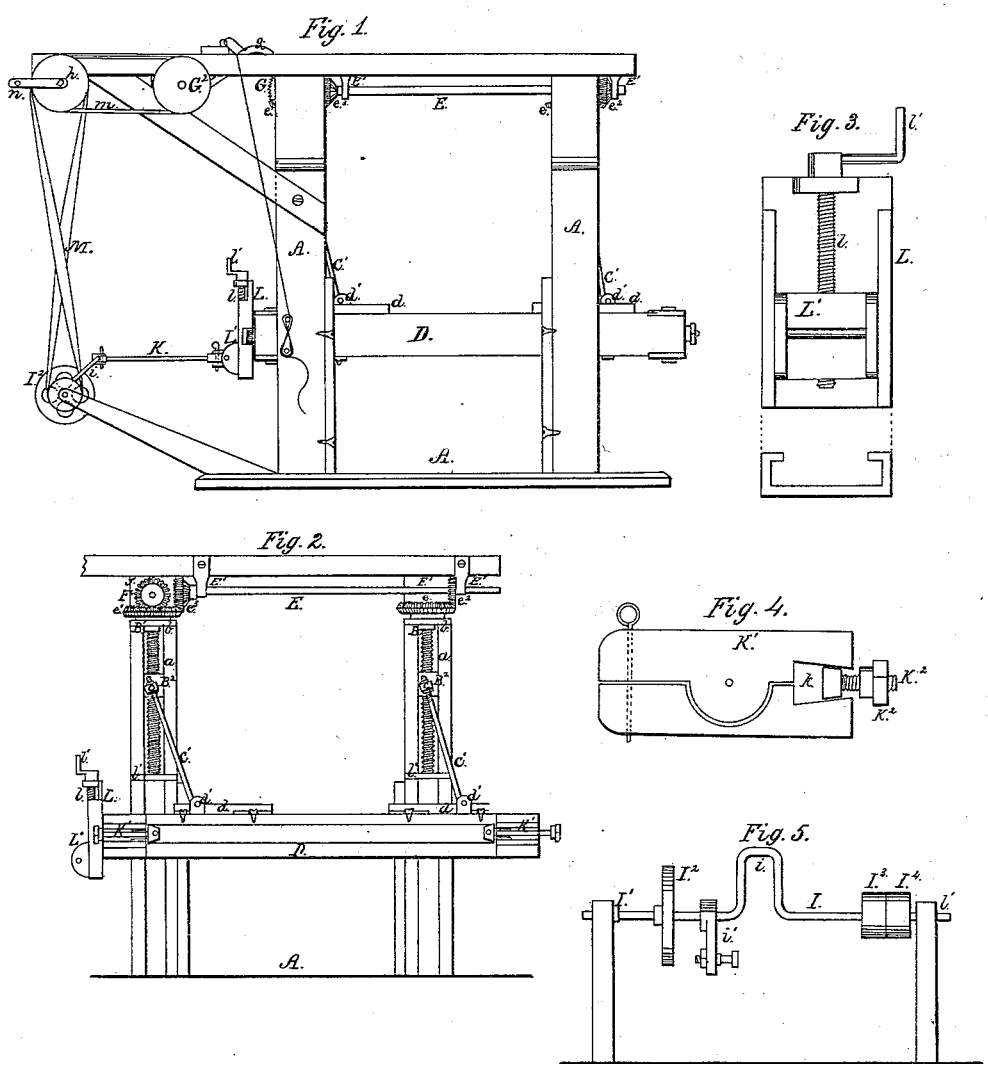
Witnesses,
Edwin James
John S. Hollingshead Jr.
Inventor,
Richard Morgan
per J. E. T. Holmead
atty.

R. MORGAN.
STONE SAWING MACHINE.

No. 93,898. Patented Aug. 17, 1869.

Witnesses,
Edwin James
John S. Hollingshead Jr

Inventor,
Richard Morgan
per J. E. F. Holmead
atty.

United States Patent Office.

RICHARD MORGAN, OF ST. LOUIS, MISSOURI, ASSIGNOR TO HIMSELF AND HENRY TIRRILL, OF SAME PLACE.

*Letters Patent No. 93,898, dated August 17, 1869.*

---

IMPROVED STONE-SAWING MACHINE.

---

The Schedule referred to in these Letters Patent and making part of the same.

---

*To all whom it may concern:*

Be it known that I, RICHARD MORGAN, of St. Louis, in the county of St. Louis, and State of Missouri, have invented certain new and useful Improvements in Stone-Sawing Machines; and I do hereby declare that the following is a full, clear, and exact description of the same, reference being had to the accompanying drawing, and to the letters of reference marked thereon, making part of this specification, in which—

Figure 1 is a side view of the machine.

Figure 2 is a horizontal sectional view.

Figure 3 is a front and bottom view of the mechanism for adjusting the pitman.

Figure 4 is a plan view of the clamping-jaws, which hold the saw-blade, and also shows the method by which the same are adjusted.

Figure 5 is a front view of the driving-shaft and crank-connections.

Figure 6:
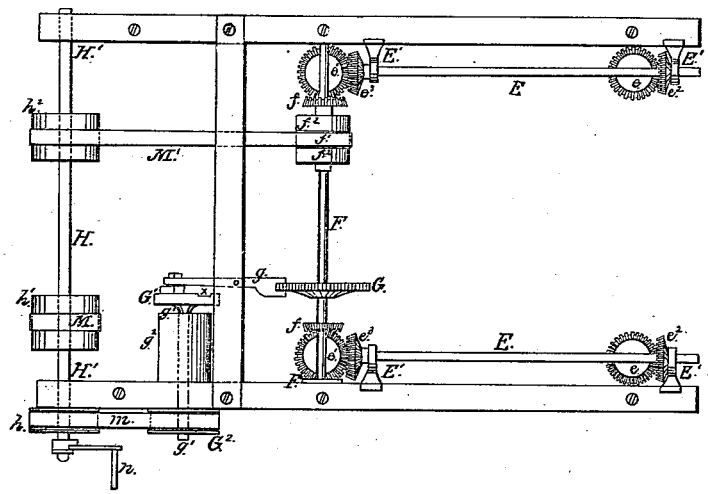
Figure 6 is a top view of the entire machine.

The nature of my invention consists in so hanging the saw-frame, that the distance between said frame and the cross-piece or bar to which it is attached, and on which it has its bearing, shall be uniform. This I accomplish simply by inserting the ends of each of the parallel bars or rods in screw-blocks, which work on suitable revolving screw-rods, which are inserted and work in grooves cut in the inner face of the uprights. These rods are supported between suitable bearing-plates, and are provided at their upper ends with bevelled-gear wheels. Each of these wheels, through suitable gearing, is connected with a shaft, which is provided with a toothed wheel, said wheel being operated by an adjustable spring-pawl, so that when motion is imparted to the shaft through the toothed wheel, a simultaneous movement is instantly given to each of the screw-rods, on which the bearings of the saw-frame work. Through a system of endless belts and pulleys, this driving-pawl is connected with and operated by the crank-shaft, to which the pitman that works the saw-frame is attached. The pitman being adjustable as well as the pawl, the movement of the same can readily be so regulated that the rods to which the frame is hung, shall descend in such a manner as to exactly accommodate the saws to the depth at which they are at work. Thus it will be seen that I entirely avoid the chief difficulty usually met with in stone-sawing machines, and especially and invariably in those which use ropes or chains for supporting the saw-frame, said ropes or chains passing over pulleys secured to stationary bearings. Practical experience has shown that this class of machines will work very well until after the saws have entered a few inches, when, the rope bearings being lengthened, instead of a uniform motion being imparted to the machine, a swinging, rocking motion is given to the frame, and the further progress of the saws is not only retarded, but rendered almost impossible. As I have said before, all these difficulties are entirely obviated in my machine.

Another feature of my invention consists in the method I use of elevating the frame. This I do by simply throwing the pawl out of gear and shifting an endless belt from a loose to a stationary pulley, by which simple means, the motion of the entire mechanism employed in lowering and elevating the saw-frame is instantly reversed.

To enable others skilled in the art to make and use my invention, I will now proceed to describe its construction and operation.

A is a rectangular frame.

The uprights $A^1$ $A^1$ of this frame are grooved on their inner faces, as seen at $a$ $a$.

On the top of each of these grooves are secured metallic bearing-plates $b$ $b$, and there are also inserted about midway of each of the same, like plates $b'$ $b'$.

Between these plates are inserted and work metallic rods $B$ $B^1$. These rods are provided with screw-threads, as clearly shown in fig. 2.

$B^2$ $B^2$ are screw-blocks, one working on each of the rods $B$ $B^1$.

C C are sliding bars, and are so connected with and supported by the blocks $B^2$ $B^2$, that while they are firmly held, still the utmost freedom of movement in their bearings is allowed, in order to permit the bars to accommodate themselves to the necessary oscillation of the frame.

From these bars C C are suspended four coupling-rods, $C^1$ $C^1$, two from each.

These rods are connected with and support the saw-frame D.

These rods are also connected with the sliding bars C C, by means of a screw-thread and nuts, which, while it affords a fixed and rigid bearing, still it furnishes one which is adjustable, and which allows the rods to be lengthened and shortened at pleasure, and the distance between the bars and frame to be correspondingly increased or diminished.

At their lower end, these rods are provided with eyes, which enter metallic sockets $d^1$ $d^1$, secured to the saw-frame, and are there held by means of pivot-pins.

The rods $B$ $B^1$ project through their upper bearing-plates $b$ $b$, and are each headed with a bevelled-pinion wheel.

The wheels $e\ e$ of the rods B B, and also the wheels $e^1\ e^1$ of the rods $B^1\ B^1$, gear into corresponding pinions $e^2\ e^2$ and $e^3\ e^3$, on the shafts E E.

These shafts E E are supported in suitable bearings E' E' attached to the sides of the frame.

The pinion-wheels $e^1\ e^1$ also gear with bevelled pinions $f\ f$, attached to the shaft F.

This shaft F is supported and works in suitable bearing-plates F' F', attached to the sides of the frame.

On this shaft F are secured a stationary pulley, $f^1$, and loose pulleys $f^2\ f^2$.

There is also secured to this shaft F, a toothed wheel, G, which is worked by a pawl, $g$.

This pawl $g$ receives its motion from a wheel, $G^1$, which is secured on the end of a short shaft, $g^1$, which works in a tube-bearing or neck, $g^2$, projecting from the inner side of the machine.

This shaft $g^1$ projects through the frame, and on its outer end is provided with a grooved driving-pulley, $G^2$.

Figure 7:
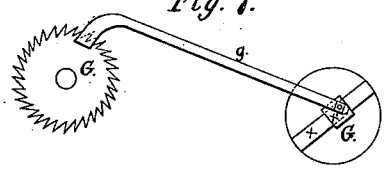
Figure 7 is a side view of the adjustable driving-pawl and toothed wheel, which, through intermediate gearing, imparts motion to the screw-rods, on which work the bearing-rods of the saw-frame.

The inner face of the wheel $G^1$ is slotted, as clearly shown at $x$, fig. 7.

In this slot the pawl $g$ is secured by an adjustable bearing, $x^1$.

H is a rod that is suspended and works in suitable bearings $H^1\ H^1$, secured to the under side of the front of the frame A.

This shaft H is on a line with and parallel to the shaft F, and is provided with three fixed pulleys, $h\ h^1\ h^2$.

The pulley $h$ is on the outside of the frame A, and is the driving-pulley of the whole mechanism.

The pulleys $h^1\ h^2$ are secured to the shaft F, and work between the upper sections of the frame A.

Figure 8:
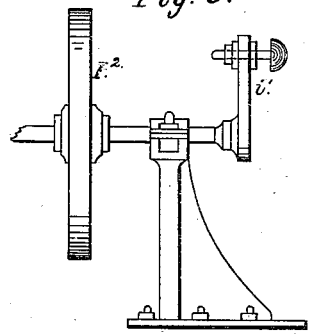
Figure 8 is a modification of fig. 5.

I is a crank-shaft, and is secured and works in suitable bearings, as clearly shown in figs. 1 and 5; or this shaft may be supported in the ordinary cast-iron chair, as shown in fig. 8.

In the crank $i$ the pitman K is secured, or the pitman may be secured to the crank-arm $i^1$.

This crank-arm is slotted, and the pitman, when secured to it, is held by an adjustable bearing, which can readily be so moved in the slot as to lengthen or shorten the stroke of the same.

Instead of the crank-arm being arranged as shown in fig. 5, the face of the wheel $I^2$ may be countersunk and slotted, and the pitman-bearing work therein.

There is also, on the shaft I, a fixed pulley, $I^3$.

On the front face of the frame D there is secured a slotted block, L, with grooved sides.

In these grooves works the socket-bearing $L^1$, to which the pitman K is secured, and by means of which the necessary vibratory or reciprocating motion is imparted to the frame D.

Through a suitable bearing in the upper portion of the block L, passes a screw, $l$, which is worked by a crank-handle, $l^1$.

This screw passes through the socket-bearing $L^1$, and by means of which it can be elevated or lowered at pleasure.

Thus it will be seen that the pitman K is provided with a double plan of adjustment, by means of which its length can be increased or diminished at pleasure, and whereby a uniform movement may be imparted to the saws, even when the frame is elevated or lowered very much above or below the centre of the driving-shaft.

The saws are held by bearing-blocks $K^1$, which work in slots arranged at the ends of the machine.

These blocks $K^1\ K^1$ are of the form shown in fig. 4, and are constructed in two sections and pivoted together.

The forward ends of these sections form jaws, between which the saw is grasped and held.

The rear of these blocks $K^1\ K^1$ is cut away so as to leave a tapering recess, $k$.

In this recess works a wedge-shaped headed screw, $K^2$, which is provided with a nut, $k^2$.

By simply tightening this nut, the jaws are drawn together, and the saw firmly grasped.

$d\ d$ are guide-plates on the upper face of the frame D.

Another advantage of my machine is that it is constructed without any rear cross-timber at its upper section, whereby the stone can be the more readily elevated and deposited between the sides of the saw-frame.

The operation is as follows:

Through the crank-handle $n$, or by any other power, usually steam, motion is given to the wheel $h$, which, through the endless belt $m$ and pulley $G^2$, imparts motion to the pawl $g$, which drives the toothed wheel G, which, in turn, revolves the shaft F.

The pinions $f\ f$ communicate motion to the wheels $e^1\ e^1$, which revolve the rods $B^1\ B^1$, but the pinions $e^1\ e^1$ also gear with the pinions $e^3\ e^3$, which revolve the shafts E E, whose outer pinions $e^2\ e^2$, gearing with the pinions $e\ e$, turn the rods B B.

Thus, by a simultaneous movement, the rods B B $B^1\ B^1$ are revolved, and the frame duly lowered.

Owing to the fact that the pawl $g$ is adjustable, it can be so adjusted as to revolve the wheel G with greater or less speed, and thus the revolution of the rods B B $B^1\ B^1$ can easily be regulated, and the frame lowered, in such a manner as to exactly accommodate itself to the cut of the saw.

When motion is imparted to the wheel $h$, the shaft H is revolved, which carries with it the fixed pulleys $h^1\ h^2$.

Over the pulley $h^1$ passes the endless belt M, which, through the fixed pulley $I^3$, revolves the crank-shaft I, which, through the pitman K, imparts the necessary vibratory motion to the saw-frame D.

M' is an endless belt, that passes over the fixed pulley $h^2$ on the shaft H, and one of the pulleys $f^1\ f^2$ of the shaft F.

When the machine is at work, the belt M' works on one of the loose pulleys $f^2\ f^2$, but after the stone has been sawed, by simply throwing the pawl $g$ out of gear, and shifting the belt M from the fixed pulley $I^3$ to the loose pulley $I^4$, and the belt M' from the loose pulley $f^2$ to the fixed pulley $f^1$, the entire mechanism connected with the frame is reversed, and the frame is thus readily elevated.

Having thus fully described my invention,

What I claim therein as new, and desire to secure by Letters Patent of the United States, is—

1. The screw-rods B $B^1$, when they are supported by and work between stationary bearings $b\ b^1$, screw-blocks $B^2\ B^2$, sliding bars C C, shafts E F, and their connecting pinions, when the same are so combined and arranged as to operate substantially as described.

2. The shaft F, when the same is provided with a toothed wheel, G and stationary pulley $f^1$, said wheel and pulley being so arranged, that by a pawl, $g$, and endless belt M', the shaft can be made to operate in either direction, the power that is transmitted through intermediate mechanism, from the driving-shaft, when applied to the wheel, lowering the saw-frame, and when applied to the pulley, elevating the same, substantially as described.

3. The toothed wheel G, pawl $g$, and wheel $G^1$, when the latter has a slot, $x$, whereby the bearing of the pawl may be adjusted, substantially as described.

4. The saw-frame D, block L, socket-bearing $L^1$, screw $l$, and pitman K, when the same are so combined and arranged as to operate substantially as described, as and for the purpose specified.

In testimony whereof, I have signed my name to this specification, in the presence of two subscribing witnesses.

RICHARD MORGAN.

Witnesses:
JOHN S. HOLLINGSHEAD,
EDWIN JAMES.